(12) United States Patent
MacMillan

(10) Patent No.: US 6,256,605 B1
(45) Date of Patent: Jul. 3, 2001

(54) SYSTEM FOR AND METHOD OF SUMMARIZING ETYMOLOGICAL INFORMATION

(76) Inventor: Alan S. MacMillan, 1530 43rd st., Los Alamos, NM (US) 87544

(*) Notice: Subject to any disclaimer, the term of this patent is extended or adjusted under 35 U.S.C. 154(b) by 0 days.

(21) Appl. No.: 09/435,585
(22) Filed: Nov. 8, 1999
(51) Int. Cl.[7] .............................. G06F 17/21; G06F 17/30
(52) U.S. Cl. ................................... 704/10; 704/1; 707/3; 707/532; 434/169
(58) Field of Search ...................... 704/1, 9, 10; 707/3.4, 707/5, 7, 104, 530, 531, 532, 536; 434/156, 157, 167, 169

(56) References Cited

U.S. PATENT DOCUMENTS 4,674,066 * 6/1987 Kucera ...................................... 707/5
5,056,021 * 10/1991 Ausborn .................................. 704/9
5,541,836 * 7/1996 Church et al. ........................... 704/7

OTHER PUBLICATIONS

"User Defined Dictionary", IBM Technical Disclosure Bulletin, vol. 35, No. 1B, p. 256, Acc No. NB9206256, Jun. 1992.*

Flanders: "Random House Webster's Electronic Dictionary . . . ", Computers in Libraries, vol. 12, No. 8, pp. 46–48, Dialog File 233, Acc No. 00289058, Sep. 1992.*

"Lexical Part of Speech Labeling without a Lexion for Use in Natural Language Parsing", IBM Technical Disclosure Bulletin, vol. 35, No. 5, pp. 465–467, Acc No.: NN9210465, Oct. 1992.*

* cited by examiner

Primary Examiner—Joseph Thomas

(57) ABSTRACT

A computer implemented system for and computer implemented method of summarizing English language etymological information. For each analyzed word, only the primary language or languages of origin are specified. Furthermore, this information is provided in a single line of text. Thus the main objective of this method is to make the major features of the etymology immediately apparent in a single line of text. This method can be implemented on a Personal Computer using word processing software to write a Language Database and Search Macros so the user may easily query the database for words and obtain a printout. A user may type in a single word, multiple words, or an entire paragraph and receive a printout listing an etymological analysis of each word, one analyzed word per line. Secondly, a user may access a Thesaurus with Etymology Database, type in a single word, for example, a medical term, and receive a printout of related medical terms, each etymologically summarized on one line of text. Thirdly, a user may request a listing of English words from any given foreign language; again the printout shows one analyzed word per line. In another embodiment, this method can be implemented as an interactive web site on the Internet. A visitor to the web site can perform the same three searches just described above. This method of summarizing etymological information is not meant to substitute for the traditional dictionary approach but rather to be a useful alternative.

6 Claims, 9 Drawing Sheets

Greek Section 2   Greek words adapted into English after 1100

| Word | | Etymology |
|---|---|---|
| abacus | ‡ | [Gr ἄβαξ   abax = counting table, board sprinkled w/ fine sand for marking on] prob [Hebrew 'ābāq = dust] <1387 |
| abyss | | [Gr ἄβυσσος   abussos = bottomless : a- (without) + bussos (bottom)] c1300-abime ; <1398-abyssus |
| acacia | | [Gr ἀκακία   akakia = thorny Egyptian tree of the mimosa family : akis = point, barb alluding to tree's thorns] <1398 |
| academy | | [Gr Ἀκαδήμεια Akadēmia =grove near Athens; after Akadēmos,hero who rescued Helen; later, site of Plato's school] 1474 |
| acne | | [LGr   aknē misspelling (in 6th cent) of Greek ἀκμή akmē = highest point // also, skin eruption on face] 1835 |
| acoustic | | [Gr ἀκουστικός akoustikos = pertaining to hearing from akouein = to hear] 1605 |
| acrobat | | [Gr ἀκρόβατος akrobatos = walking on tiptoe : acro (at the top) + bainein (to go, walk)] 1825 |
| acronym | | [Gr   ἀκρ- acr- (outermost, end)+ ὄνυμα onym (name): combines outermost/first letters to make a name] 1943 |
| acrophobia | | [Gr   ἀκρο- acro- (at the end, top) + φόβος phobos (fear)] 1892 |
| acropolis | | [Gr ἀκρόπολις akropolis = acro- (highest, upper) + polis (city)] 1662 |
| adenoid | | [Gr ἀδενοειδής adenoeidēs = glandular: adēn (a gland) + eidos (form, shape)] 1839 |
| adiabatic | | [Gr ἀδιάβατος adiabatos=impassible: a- (not) + dia- (through) + banein (to go)] 1859-Chem: w/o any loss or gain of heat |
| aegis | | [Gr αἰγίς   aigis = shield of Zeus (made of goatskin) aig-, aix = goat (later, the shield of Athena)] 1611 |
| aerobic | | [Gr   ἀήρ aēr (air)+ βίος bios (life)] {coined 1863 in F Louis Pasteur} aerobics exercise: coined KCooper 1968 |
| aerodynamic | | [Gr   ἀήρ aēr (air) + δυναμικός dunamikos (powerful from dunasthai = to be able)] 1837 |
| aerosol | & | [Gr   ἀήρ aēr (air)] & [Lat solūtiōnem = a loosening from solvere = to loosen, untie, dissolve] 1923 |
| aesthetic | | [Gr αἰσθητικός aisthētikos =sense perception] {adapted in art,beauty 1750-58 in Germ Baumgarten} cf (med) anesthetic |
| agape | | [Gr ἀγάπη   agape = spiritual love, brotherly love] 1607 |
| agate | | [Gr ἀχάτης   akhatēs = agate named after river Achates in Sicily where Pliny reports mineral was first found] 1570 |
| agave | | [Gr ἀγαυή   agauē = noble] 1797 used for food, soap, fiber aka American aloe / century plant, blooms once and dies |
| agnostic | | [Gr ἄγνωστος   agnōstos=unknown: a-(not) +gnōsis (knowledge)] {not know if God exists: adapted 1869 ThomasHuxley} |
| agony | | [Gr ἀγωνία   agōnia =a struggle for victory/gymnastics, wrestling/anguish of mind : agōn = a contest, struggle] 1384 |
| agoraphobia | | [Gr   ἀγορά agora (marketplace) + φόβος phobos (fear)] {coined 1871 in German by Carl Westphal} |
| air | | [Gr ἀήρ   aēr = air, lower atmoshpere] c1230 |
| airplane | & | [Gr   ἀήρ aēr (air)] & [Lat plānum=flat surface (i.e. the wing)] in descr an insect wing-1866; fl machine-1873 |
| alabaster | ‡ | [Gr ἀλάβαστος alabastos = alabaster] prob [Egypt *a-la-baste = vessel of the goddess Bast (cat-headed goddess)] 1375 |
| alchemy | ‡+ | [Arab al-kīmiyā' :al-] & {[EHierogl Khmi="Egypt" (=black earth)] or [Gr khymos=juice (orig extracting plant j)]} 1362 + |
| Alexander | | [Gr Ἀλέξανδρος Alexandros = "defender of men" : alexein (to defend) + andr- (man)] |
| allegory | | [Gr ἀλληγορία allēgoria=speak otherwise than one seems: allos(other)+agoreuein (speak publicly: agora=marketpl)] 1382 |
| allergy | | [Gr   ἄλλος allos (other) + ἔργον ergon (action)] {coined 1906 in German by von Pirquet, Austrian pediatr.} |
| Almagest | & | [Arabic al-majisti : al (the)] & [Gr μεγίστη megistē=greatest superlative of megas=great] c1386 Ptolemy, fl 2nd centAD |
| almanac | ‡+ | [MLat almanac] unkn/perh [Sp-Arab al-manākh (calendar)] and/or [LGr ἀλμενικιακά almenikhiaka=ephemeris] c1391 |
| almond | | [Gr ἀμυγδάλη   amugdalē = almond] c1300 resemb peach; leaves/twigs cyanide: 2 varieties: sweet //bitter(pits have cyan) |
| alphabet | | [Gr ἀλφάβητος alphabētos = alphabet : alpha + beta, first letters in Gr taken to repr the whole] prob<1425; 1580-alphabet |
| alyssum | | [Gr ἄλυσσον   alusson = plant believed to cure madness / cure rabies : a- (not) + lussa (madness / rabies)] 1551 |
| amanita | | [Gr ἀμανῖται   amanitai = mushroom] 1847 most species of amanita poisonous, a. phalloides, verna, virosa are deadly |
| amaranth | | [Gr ἀμάραντος amarantos =unfading: a- (not)+marainein (to wither)] 1551 tumbleweeds are amaranth & Russian thistle |
| amaryllis | | [Gr Ἀμαρυλλίς Amarullis = typical name of country girl] {adapted by Linnaeus 1707-1778} 1794 poisonous bulb |
| Amazon | | [Gr Ἀμαζών   Amāzōn=a- (w/o)+mazos (breast): women warriors-Caucasus: fabled cut off right breast for archery] 1398 |
| ambrosia | | [Gr ἀμβροσία   ambrosia = "immortality", food of the gods : a- (not) + brotos (mortal)] 1555   cf nectar, drink of the gods |
| amethyst | | [Gr ἀμέθυστος amethustos = a- (not) + methusos (intoxicated): methu= wine] c1290 supposedly prevented intoxication |
| ammonia | ‡ | [Gr Ἀμμωνιακός Ammoniakos=of Ammon] [Egypt Amūn (Deity)] c1330 salt found nr temple of Amūn, Siwa,NWEgypt |
| amnesia | | [Gr ἀμνησία   amnēsia = forgetfulness : a- (not) + mimnēskein (to remember)] 1786 |
| amnesty | | [Gr ἀμνηστία   amnēstia = a forgetting : a- (not) + mimnēskein (to remember)] 1580 |
| amniocentesis | | [Gr   ἀμνίον amniōn (inner membrane around fetus; dim amnos=lamb) + κεντεῖν kentein (to prick,stab)] 1958 |
| amniotic | | [Gr ἀμνίον   amniōn= inner membrane around the fetus : dim of amnos = lamb] amnion-1667; amniotic-1822 |
| amoeba | | [Gr ἀμοιβή   amoibē = change : fr ameibein = to change] {coined in New Latin 1841} 1855 |
| amoral | & | [Gr   ἀ- ] & [Lat mōrālis=of morals: mōs = one's manner: (pl) mōrēs = customs] {app coin RLStevenson 1882} |
| amorphous | | [Gr ἄμορφος   amorphos : a- (without) + morphē (form, shape)] 1731 |
| amphibian | | [Gr ἀμφίβιος   amphibios = "living in both"; living a double life : amphi- (of both kinds) + bios (life)] 1609 |

FIG. 1

Results from the Search of Dictionary of Concise Etymology :

*Search Items* : atom slogan algebra cashew candidate lord brochure handicap enthusiasm Kilimanjaro

| | |
|---|---|
| atom | [Gr ἄτομος  atomos=not able to be cut: a-(not)+ tomos (piece cut off):temnein=to cut {coin Democritisc430BC}] 1477 |
| slogan | [Scottish & Irish slogorne = battle cry  from Scottish Gaelic  sluagh-ghairm : sluagh (host) + gairm (shout)] 1513 |
| algebra | [Arab al+jebr (reunion of broken parts,bone-setting):jabara=bind together] <1400 {coin by al-Khwarizmi;book title c850}+ |
| cashew | [Tupi (Brazil/Amazon) acajú = the cashew tree] 1703 shell of the nut has poison very similar to poison ivy |
| candidate | [Lat candidātus=clothed in white (office seekers wore white toga to symb spotless character):candidus=shining white] 1600 |
| lord / Lord | [OE hlāford = "*bread guardian*", master of a household : hlāf (bread) + weard (guard, keeper cf ward, warden)] c725 B |
| brochure | [F brochure = a stitched work (pages were stitched together): brocher = to stitch] ----- [Lat broccus = projecting] 1748 |
| handicap | [ModEngl "hand in cap": bartering game; put hands in cap w/ money & withdraw hands full/empty to acc/decl a deal] 1649 |
| enthusiasm | [Gr ἐνθουσιασμός  enthousiasmos = to be inspired by god  fr entheos = having the god within: en (in) + theos (god)] 1603 |
| Kilimanjaro | [EastAfrican Kilima-njaro = "Mountain of Greatness" : kilima (mountain) + njaro (great)] 1849 |

FIG. 2

Results from the Search of THESAURUS (with Etymology):

*Search Item*: basil

FOOD & COOKING/ EATING / SPICES utensils, plates, cups & dishes
herbs & spices  (see also flavorings)

| | | |
|---|---|---|
| allspice | | [ModEngl all + spice] 1621 combin of flavors of cinnamon, nutmeg, cloves; *berries of WIndies allspice tree*; aka pimento |
| anise | | [Gr ἄνισον   anison = anise] c1300  seeds used as flavoring; somewhat similar to taste of licorice |
| basil | | [Gr βασιλικόν  basilikon = basil, "royal" from basileus = king] 1373 ; cognates basilica, basilisk |
| bay ⁵ | | [OF baie = berry] ----- [Lat bāca = berry] c1450  the laurel tree or shrub; leaves used for flavoring |
| caraway | ‡ | [Arabic karāwiyā] [Gr κάρον karon = caraway]  1281-82  the seeds in rye bread |
| cardamom | | [Gr καρδάμωμον  kardamōmon: kardamon (cress) +amōmon (an Indian spice)] 1398 seeds of East Indian plant as a spice |
| chamomile | | [Gr χαμαίμηλον  khamaimēlon = khamai (on the ground) + melon (apple)] 1398  from apple-like scent of blossoms |
| chili | | [Nahuatl (Aztec) chilli = native name for the hot red pepper]  1662 |
| chives | | [OF cive] [*Lat* cēpa = onion] c1390  herb in lily family; slender hollow leaves used as mild onion-flavored seasoning |
| cilantro | | [Span culantro] ----- alt of [LLat coliandrum : Lat coriandrum] [Gr κορίαννον koriannon=coriander] c1900 aka coriander |
| cinnamon | | [Phoenician (a Semitic languge) akin to Hebrew qinnāmôn]  1390 |
| clove ¹ | | [Lat clāvus = nail, spike] <1200  spice: dried unopened flower buds/ tree, Moluccas  cf unrelated clove ² (clove of garlic) |
| clove ² | | [OE clufu = clove (of garlic) cogn clĕofan = cleave ¹ , to cut asunder, split;  IE] c1000 ;  cf unrelated clove ¹ (the spice) |
| coriander | | [Gr κορίαννον koriannon = coriander]  1373   aka Chinese parsley, cilantro |
| cumin | | [Semitic origin; cf Hebrew kammôn, Arabic kammûn] c897 ;  "seeds" are dried fruits; for chili and curry powders, chutneys |
| curry | | [Tamil (Dravidian) kari = sauce, relish for rice] 1681  curry powder = cumin, coriander, turmeric + other |
| dill | | [OE dile ; Gmc] <700  dill pickle |
| fennel | | [OE fenol c1000 : earlier finugl c700] [*Lat* fēniculum  dimin of fēnum = hay]   cf marathon = fennel |
| garlic | | [OE gārlēac : gār (spear  from shape of cloves) + lēac (leek)  c700] |
| ginger | | [Sanskrit śṛṅgavera = ginger] [*Dravidian* ;  cf Tamil iñci (ginger) + vēr (root)] c1000 |
| herb | | [Lat herba = grass, plant, herb]  <1300 |
| mace ² | ‡ | [MLat macis] a scribal error for [Gr μάκιρ makir = a fragrant resin of the tree ailanthus]  1234  the husk of the nutmeg |
| marjoram | | [MedLat majorana = sweet marjoram ; ult origin unkn] 1373 ;  cf oregano = wild marjoram |
| mint ² | | [Gr μίνθη       minthē = mint] <800 ;   menthol, obtained from peppermint oil, is used as a mint flavoring |
| mustard | | [Lat mustum = must, unfermented wine : it was orig prepared by adding must or new wine to ground mustard seeds] 1289 |
| nutmeg | | [MLat nux muscata = nutmeg, "musk-scented nut" :  nux (nut) + muscata (musky)] <1300 |
| oregano | | [Gr ὀρίγανον   origanon = wild marjoram : closely related to & less sweet than "marjoram"] 1150 |
| paprika | ‡+ | [Hung paprika =ground pepper] [Gr πέπερι peperi] [Sanskrit pippalam =pepper plant] 1896 ; powdered sweet red pepper |
| parsley | | [Gr πετροσέλινον  petroselinon : petra (rock) + selinon (parsley  selinon is orig of "celery", a member of p family)] c1000 |
| pepper | ‡ | [Gr πέπερι peperi] [Sanskrit pippalī = berry // *peppercorn*] c1000 Æ; applied to other plants, esp the bell pepper-c1884 |
| poppy | | [Lat papāver =poppy] c700 morphine/codeine/heroin only fr opium poppy; poppy-seeds(seasoning) are also fr opium poppy |
| rosemary | | alt (by assoc rose + Mary) of [Lat rōs marīnus ="sea-dew" (supp grew near the sea): rōs (dew) + marīnus (of the sea)] 1373 |
| saffron | | [Arabic za'farān] <1200 ;  made from dried aromatic stigmas of the crocus |
| sage ² | | [Lat salvia = "the healing plant" : from salvus = "safe", healthy, well, sound] <1325;  cf sage ¹ = wise |
| salt | | [OE sealt, salt] [IE *sal- = salt] <830 ;  cf Gr hals = salt, sea,  Lat sāl |
| sesame | | [Semitic origin cf Assyrian šamaš-šammu = "oil-seed", sesame;  also cf Arabic simsim] c1425  used for halvah and tahini |
| spice | | [OF espice] [*LLat* speciēs =wares, goods, spices  Lat speciēs =outward appearance, form, kind : specere=to behold] <1200 |
| tarragon | ‡ | [Arabic ṭarkhūn]  perhaps from [Gr δράκων drakōn = dragon] 1538 |
| thyme | | [Gr θύμον      thumon=thyme-used in temples as incense: thuein=make a burnt offering] [IE *dhu=cause to smoke] 1398 |
| turmeric | | [MLat terra merita ="worthy earth": terra + merēre (to be worthy), perhaps ≡"earth's treasure"] <1425 ; powdered rhizome |

FIG. 3

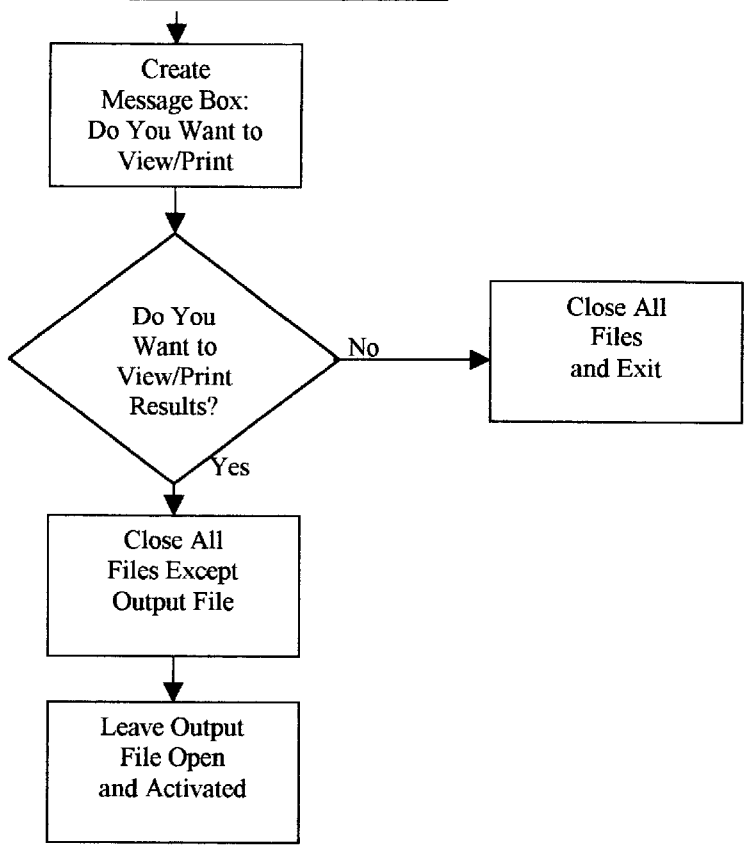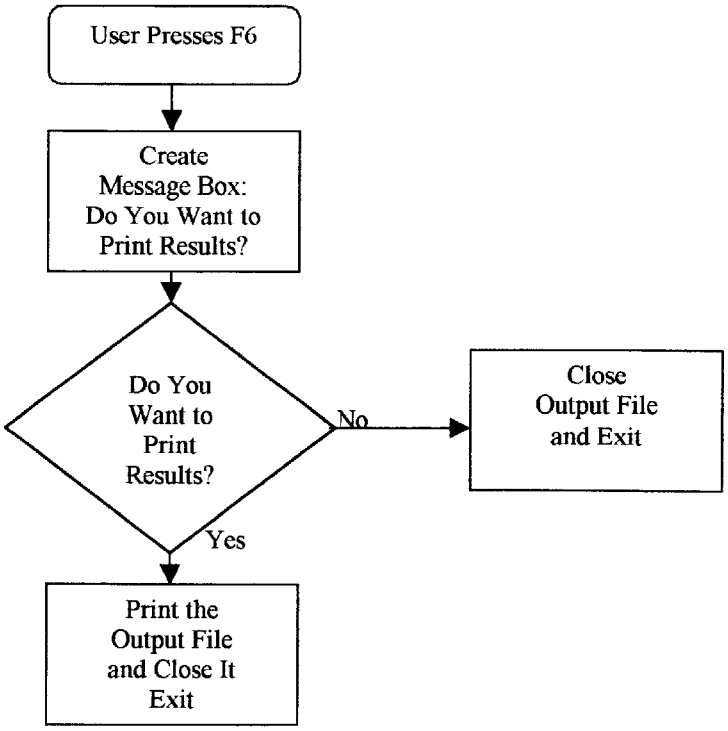
FIG. 6

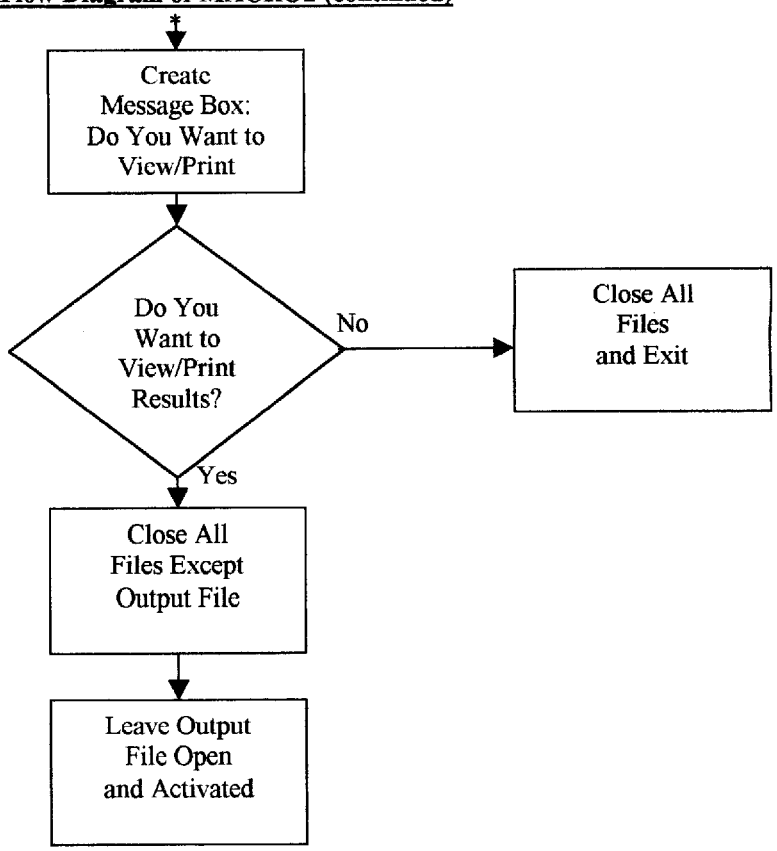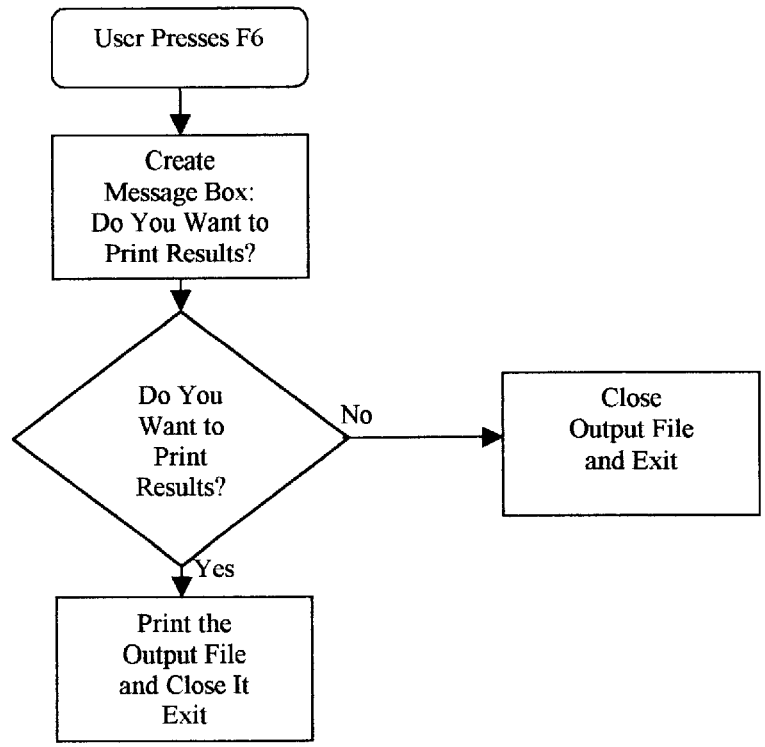
FIG. 9

SYSTEM FOR AND METHOD OF SUMMARIZING ETYMOLOGICAL INFORMATION

CROSS-REFERENCE TO RELATED APPLICATIONS

Not Applicable

BACKGROUND

1. Field of the Invention

This invention relates to etymology, the study of the history and origin of words.

BACKGROUND

2. Description of Prior Art

Dictionaries usually include a section of etymological information for each entry, tracing the history of a given word from its origins to the modern day. For example, a typical entry in a dictionary would be:

authentic . Middle English autentik, from Old French autentique, from Late Latin authenticus, from Greek authentikos, from authentēs, one acting on one's own authority (aut- stem of autos self+-hentēs doer, worker)

Etymological information is useful to adults, since it often gives new insights into the meanings of everyday words. It is also useful to children and adolescents learning English as well as to non-English speaking foreigners trying to unravel the mysteries of the language.

However, the average person seldom consults the dictionary for etymological information. Perhaps he or she feels it is too complicated to plow through a whole long explanation of a word's history to get at the original or literal meaning of a word. It is indeed sometimes a daunting task to look up a word, to read through the etymology (sometimes getting referred to additional words, prefixes, and suffixes elsewhere in the dictionary), and to come away with the most essential information about the history and origin of a word.

Moreover, the etymology of words is not strongly emphasized in schools. Fifty years ago, students routinely learned Latin and sometimes even Greek in junior high and high school. Those lucky people who had such training begin to appreciate, oftentimes much later in life, the insight that etymology gives them into everyday words.

There are alternative ways of presenting etymology information so as to make it more accessible to the average person.

SUMMARY OF THE INVENTION

In accordance with the present invention, for each analyzed word only the primary language or languages of origin are given for the etymology. Additionally, this information is presented in only one line of text.

OBJECTS AND ADVANTAGES

Accordingly, several objects and advantages of the present invention are:

(a) to provide a complementary method of presenting etymological information; that is, a method not meant to substitute for the traditional dictionary approach but rather to be a useful alternative;

(b) to provide only the most important etymological information for a given word, thus making that information immediately apparent to the user;

(c) to provide a method conveniently adaptable to the personal computer; making possible easy to use searches for and easy to read printouts for:

(i) a single word to be analyzed.
  (ii) several words or an entire paragraph to be analyzed (d) to provide the method for yet additional ways to present etymology on the personal computer; for example:

(i) one can easily print out a list of English words originating from the Greek
  (ii) one can access a thesaurus database and print out a list of medical terms relating to surgery; the difference from the usual thesaurus being that the short one line of etymological information is included for each word in that list.

BRIEF DESCRIPTION OF THE DRAWINGS

These and other aspects of the present invention will become apparent in the detailed description herein with reference to the following accompanying drawings, in which:

FIG. 1 is a sample page from the Language Database;

FIG. 2 is a sample printout of a search for ten words from the Language Database; and FIG. 3 is a sample printout of a word search from the Thesaurus Database.

FIGS. 4, 5, and 6 Flow Diagram for MACRO1 (word search in Language Database)

FIGS. 7, 8, and 9 Flow Diagram for MACRO2 (word search in Thesaurus Database)

DETAILED DESCRIPTION

Figure 4:
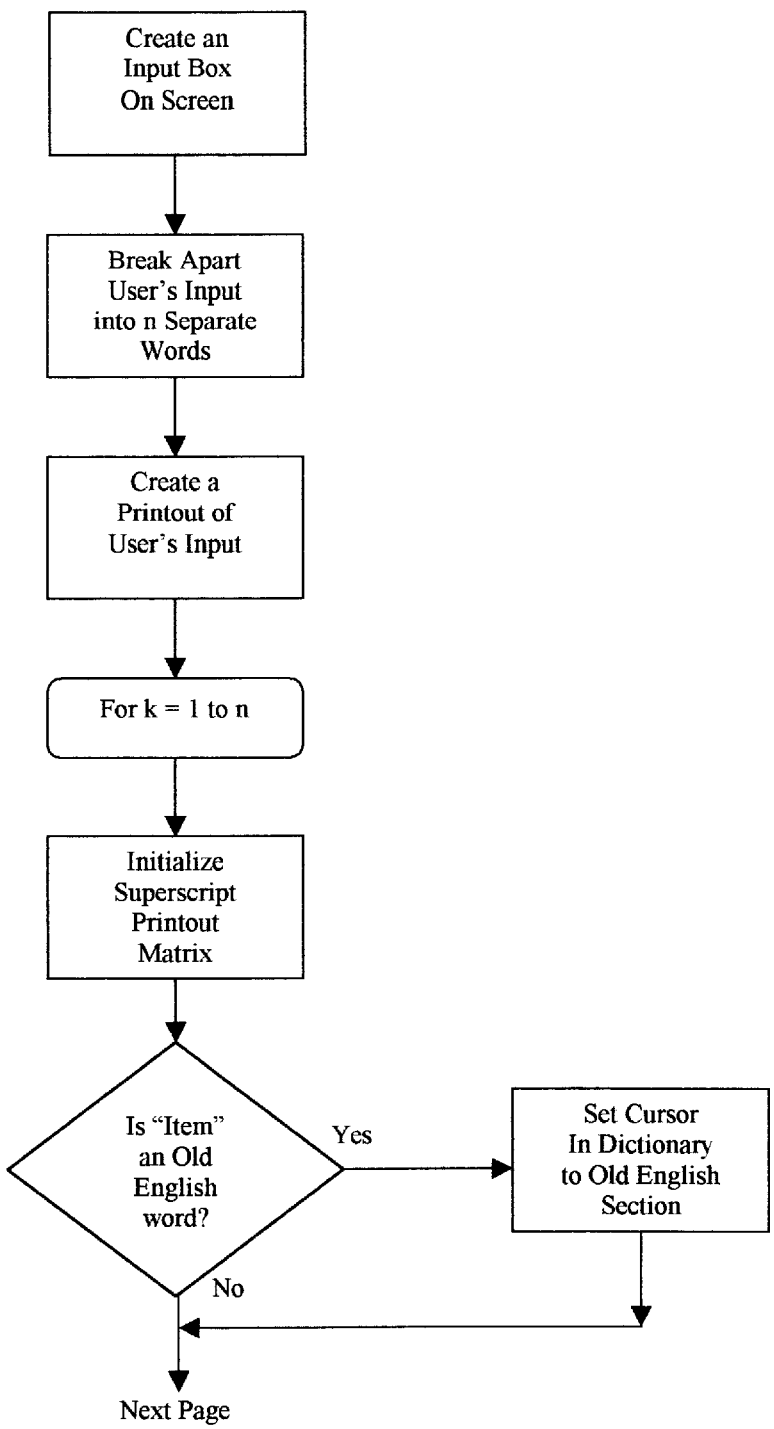

FIGS. 1, 2, 4, 5, and 6—Preferred Embodiment

There are two approaches to presenting etymological information. At one extreme, the traditional approach aims to present a complete history of each word. This is roughly the goal of most dictionaries. At the other extreme, a simplified approach presents only the minimum essential information. This latter approach is the method used in the present invention, with the aim of making etymological information far more accessible and readily understandable. Furthermore, the crucial feature of this method in the present invention is that this information is limited to one single line of text.

To repeat the same example previously cited, a typical entry in a dictionary would be:

authentic: Middle English autentik, from Old French autentique, from Late Latin authenticus, from Greek authentikos, from authentēs, one acting on one's own authority (aut- stem of autos self+-hentēs doer, worker)

The simplified approach with information all on one line would yield an analysis such as:

authentic: [Gr authentēs="self doer", one's own authority: auto(self)+hentēs (worker)]

First, it is immediately apparent that the word "authentic" is a Greek word. Second, the essential meaning or sense of the original Greek is given.

In attempting to pursue this approach, it is, of course, obvious that a great deal of information will be lost and that many inaccuracies and ambiguities will be created. But the aim of this "broad brush" approach is not meant to replace the former method but rather to be a complementary technique. It aims to paint the broader overall picture of English words; it enables one to clearly see the principal features of English words individually and the English language as a whole.

With these preliminaries in mind, the preferred embodiment of the present invention is the following:

1. A Language Database consisting of English words grouped according to their etymological origin: that is, collections of Greek words, Latin words, Old English, Old Norse (Viking), Scandinavian, Middle English, Modern English, Arabic, African, Australian, Celtic (Breton, Gaulish, Irish, Scottish, Welsh), Chinese, Dravidian/Tamil, Dutch, Egyptian, Finno-Ugric, French, Indian-N/S American, Indic/Sanskrit/Hindi, Italian, Japanese, Korean, Persian, Polynesian (Hawaiian/Malay/Javanese/Maori), Portuguese, Semitic, Slavic, Spanish, Tibetan, Turkish.

This database is written as an ordinary document file in Microsoft's Word (Word6/Word2000) on a standard Pentium based personal computer.

The unique feature of this database is that for each main entry only a single line of etymology text is given, thus making important information immediately apparent.

FIG. 1 shows a sample page from the Language Database. (Note: a printout of the 200+ page Language Database is not included in this patent application.)

2. An "interface" between the user and the Language Database was built using the same generic Pentium based PC and Word6/Word2000. The interface is a computer program written as a WordBasic/VisualBasic "macro"; a macro is a series of Word commands that can be performed by pressing a single key. In this embodiment, it is software designed to provide etymology information easily and quickly. The crucial factor is to make the simplest possible "interface" for a user. In the interface constructed for this invention, by pressing a single key the user brings up on the computer screen a simple window where up to 40 words can be entered for the computer to look up and print out.

FIG. 2 shows a sample printout of a search for ten words from the Language Database.

Figure 5:
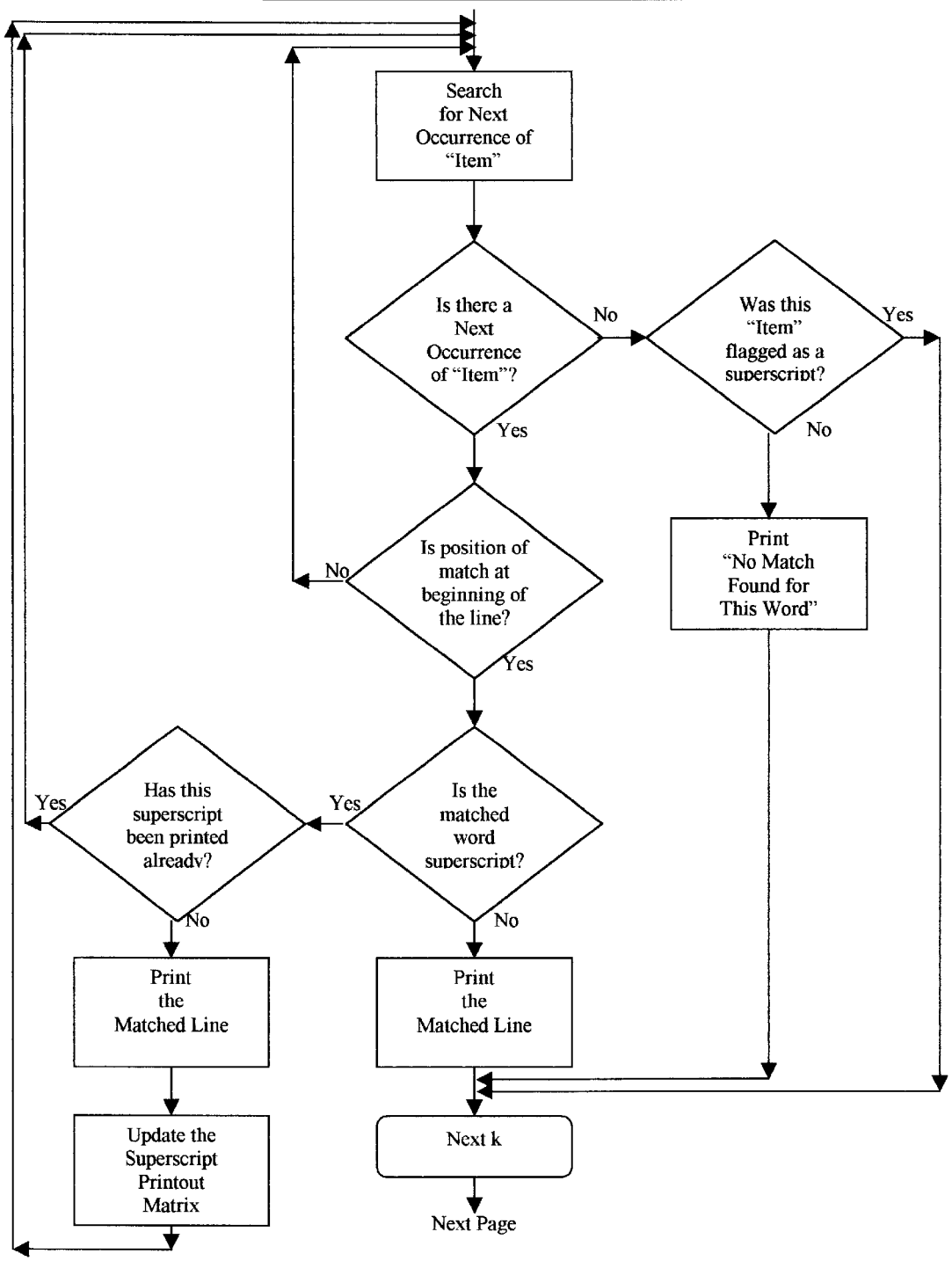

The flow diagram for MACRO1 which does the search in the Language Database is shown in FIGS. 4–6. The key noteworthy features of this flow diagram are as follows:

a) The program searches for a "good" match at the beginning of a line; for example, if the user inputs "book", the program matches the main entry in the dictionary and does not match an instance where "book" is used in the definition of some other word. Thus the program matches this line:

book [OE bōc c725] [IEur *bhāgō=beech tree] beech bark/wood used as writing tablets and does not match this line:

algebra [Arab al+jebr (reunion of broken bones)] {coin by al-Khwarizmi in book title c850} b) Superscripted words and the "Superscript Printout Matrix": in English there are many words such as bark[1], (sound of a dog), bark[2] (of a tree), and bark[3] (a sailing ship), all of which may have different languages of origin. When the user inputs the word "bark", it is desirable to print out all the different possibilities (since it's impossible to know which one the user was requesting.) The solution is to create a table/matrix to keep track of which superscripted words have been printed out already.

For example, the matrix [01100] would indicate #2 and #3 have been printed out already.

Thus, with this method, the user can request an analysis of a single word, several words, or an entire paragraph; the result is a printout listing the requested words, each analyzed etymologically in one line of text.

FIGS. 3, 7, 8, and 9—Additional Embodiment

Another embodiment of the present invention is as follows:

1. A Thesaurus with Etymology Database consisting of the same words as in the Language Database as defined in the preferred embodiment above but with the words "reshuffled" into Categories according to Subject Matter.

This database is written as an ordinary document file in Microsoft's Word (Word6/Word2000).

The unique feature of this Thesaurus with Etymology Database is that related words, each with a single line of etymology information, are grouped together. (Note: a printout of the 250+page Thesaurus with Etymology Database is not included in this patent application.)

2. An "interface" between the user and the Thesaurus Database was built. The interface is a computer program written as a WordBasicJVisualBasic "macro"; it is software designed to provide etymology information easily and quickly. In the interface constructed for this invention, by pressing a single key the user brings up on the computer screen a simple window where a word can be entered for the computer to look up. It then prints out the relevant "Thesaurus with Etymology" information.

FIG. 3 shows a sample printout of a word search from the Thesaurus Database.

Figure 7:
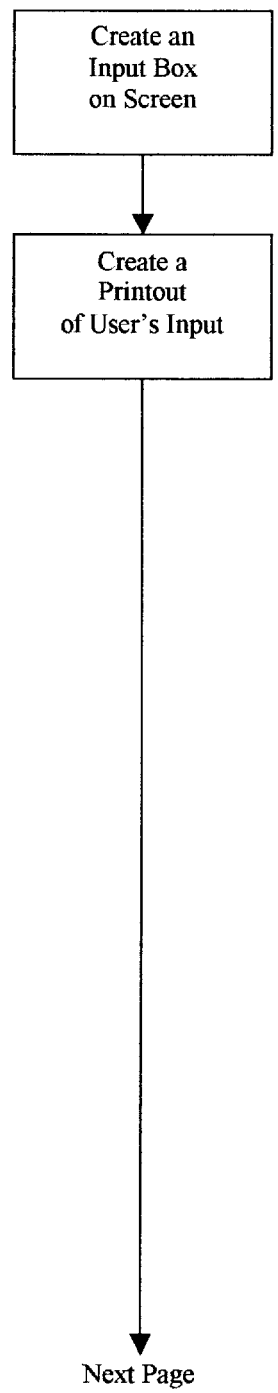
Figure 8:
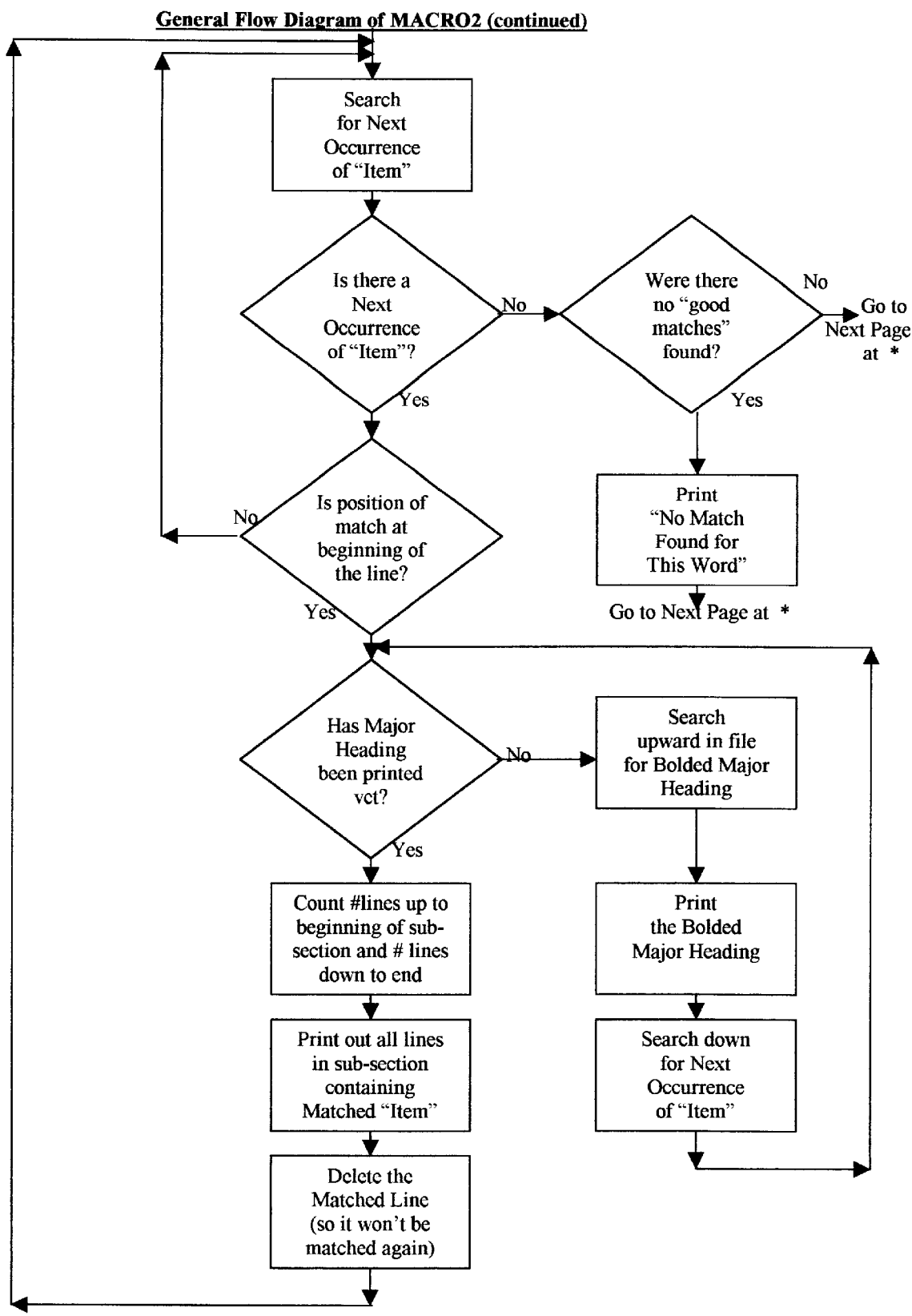

The flow diagram for MACRO2 which does the search in the Thesaurus Database is shown in FIGS. 7–9. The key noteworthy features of this flow diagram are as follows:

a) The program searches for a "good" match at the beginning of a line; for example, if the user inputs "book", the program matches the main entry in the thesaurus and does not match an instance where "book" is used in the definition of some other word. Thus the program matches this line:

book [OE bōc c725] [IEur *bhāgō=beech tree] beech bark/wood used as writing tablets and does not match this line:

algebra [Arab al+jebr (reunion of broken bones)] {coin by al-Khwarizmi in book title c850} b) In the Thesaurus, an item appears under a Major Heading and under a minor heading. Additionally, it can appear under a second minor heading. For example, "tomato" appears under the Major Heading "Food" and under the minor heading "fruits & berries" and additionally under the minor heading "vegetables". The computer program prints out the entire listing of both subsections. (Refer to FIG. 3 for a sample printout of a Major Heading, a minor heading, and an entire subsection. In that case, the one search word entered is "basil". The resultant printout is the Major Heading "Food" and the minor heading and entire subsection "herbs and spices".)

Thus, with this method, the user can request from a Thesaurus a listing of related words; the result is a printout listing those related words each analyzed etymologically in one line of text.

Alternate Embodiment

A printout of the Language Database and the Thesaurus with Etymology Database as a textbook provides a useful tool for studying the English language.

Conclusions, Ramifications, and Scope

Accordingly, the reader will see that this method of summarizing etymological information on one line of text presents a major advantage:

(a) It presents only the most important etymological information for a given word, thus making it immediately apparent to the user. Thus a user does not need to plow through a long explanation of etymology that is usually given in the dictionary and then attempt summarize for himself or herself the essential or original meaning of the word.

Furthermore, the reader will see that this method of summarizing etymological information on one line of text suggests several novel ways of presenting and describing English words. Specifically, this method can be easily adapted to the personal computer to perform the following:

(a) the user can easily run a search for single words, multiple words, or an entire paragraph and get a printout of the essential etymological information.

(b) this method can be used to present a listing of words originating from any particular foreign language. For example, one can easily print out a list of English words originating from the Greek.

(c) this method can be used to access a thesaurus database and print out a list of related terms. For example, one can easily print out a list of medical terms relating to surgery, the difference from the usual thesaurus being that the one line of etymological information is included for each word in the list.

Additionally, as a textbook, the Language Database and the Thesaurus with Etymology Database are useful tools for studying the English language.

It is to be emphasized that this method is not meant to substitute for the traditional dictionary approach but rather to be a useful alternative technique. It is simply a complementary method of presenting etymological information. It is meant to provide a user with an better overall view of individual English words as well as an improved overall view of the structure of the language as a whole.

The scope of the invention should be determined by the appended claims and their legal equivalents, rather than by the examples given.

I claim:

1. A computer implemented system for summarizing etymological information comprising:

(a) a dictionary and thesaurus database of etymological information consisting of, for each analyzed word, only the primary language or languages of origin on only one line of text;

(b) interactive search software which gives the user the means to search the database;

(c) means for requesting the analysis of at least one word and for obtaining a listing of said at least one word etymologically analyzed in the form of one analyzed word per line of printout;

(d) means for inputting a single word and for obtaining from said thesaurus database a listing of related words each etymologically analyzed in the form of one analyzed word per line of printout; and (e) means for requesting and obtaining a list of English words originating from any particular foreign language.

2. The system of claim 1, wherein the system is embodied on a personal computer written in word processing software and stored on computer memory.

3. The system of claim 1, wherein the system is embodied as an interactive web site on the Internet.

4. A computer implemented method of summarizing etymological information comprising:

(a) generating a dictionary and thesaurus database of etymological information consisting of, for each analyzed word, only the primary language or languages of origin on only one line of text;

(b) providing interactive search software which gives the user the means to search the database;

(c) requesting the analysis of at least one word and for obtaining a listing of said at least one word etymologically analyzed in the form of one analyzed word per line of printout;

(d) inputting a single word and for obtaining from said thesaurus database a listing of related words each etymologically analyzed in the form of one analyzed word per line of printout; and (e) requesting and obtaining a list of English words originating from any particular foreign language.

5. The method of claim 4, wherein the method is implemented on a personal computer written in word processing software and stored on computer memory.

6. The method of claim 4, wherein the method is implemented as an interactive web site on the Internet.

* * * * *